United States Patent
Ro

(10) Patent No.: US 12,502,184 B2
(45) Date of Patent: Dec. 23, 2025

(54) BONE CUTTING TOOL ASSEMBLY FOR ARTIFICIAL JOINT SURGERY

(71) Applicant: CONNECTEVE CO., Ltd., Seoul (KR)

(72) Inventor: Du Hyun Ro, Seoul (KR)

(73) Assignees: CONNECTEVE CO., Ltd., Seoul (KR); SEOUL NATIONAL UNIVERSITY HOSPITAL, Seoul (KR)

( * ) Notice: Subject to any disclaimer, the term of this patent is extended or adjusted under 35 U.S.C. 154(b) by 367 days.

(21) Appl. No.: 18/213,273

(22) Filed: Jun. 23, 2023

(65) Prior Publication Data
US 2024/0081837 A1    Mar. 14, 2024

(30) Foreign Application Priority Data
Sep. 13, 2022    (KR) .................. 10-2022-0114736

(51) Int. Cl.
*A61B 17/16* (2006.01)
*A61B 17/17* (2006.01)

(52) U.S. Cl.
CPC ...... *A61B 17/1764* (2013.01); *A61B 17/1617* (2013.01); *A61B 17/1637* (2013.01); *A61B 17/17* (2013.01); *A61B 17/1659* (2013.01)

(58) Field of Classification Search
CPC ............ A61B 17/1617; A61B 17/1637; A61B 17/1764
See application file for complete search history.

(56) References Cited

U.S. PATENT DOCUMENTS

| | | | | |
|---|---|---|---|---|
| 854,956 A | * | 5/1907 | Martin | A61B 17/1617 606/180 |
| 4,421,112 A | * | 12/1983 | Mains | A61B 17/1764 606/88 |
| 5,053,037 A | * | 10/1991 | Lackey | A61B 17/155 606/88 |
| 5,078,719 A | * | 1/1992 | Schreiber | A61B 17/15 606/87 |
| 5,597,379 A | * | 1/1997 | Haines | A61B 17/1764 606/88 |

FOREIGN PATENT DOCUMENTS

KR    10-2010-0092788 A    8/2010

\* cited by examiner

*Primary Examiner* — Christian A Sevilla
(74) *Attorney, Agent, or Firm* — Han's Law Office

(57) ABSTRACT

Provided are a bone cutting tool assembly for artificial joint surgery. The assembly comprises a guide unit including a body having at least one guide slit and an anchor configured to extend from a side of the body, having a plurality of pin insertion holes; and a length measuring unit including a reference module having a slit insertion part inserted into the guide slit and a moving guide part extending in a direction perpendicular to a surface of the slit insertion part, and a position variable module slidingly coupled to the reference module through the moving guide part.

8 Claims, 20 Drawing Sheets

BONE CUTTING TOOL ASSEMBLY FOR ARTIFICIAL JOINT SURGERY

A. TECHNICAL FIELD

The present disclosure relates to cutting a bone during artificial joint surgery, and more specifically, to a bone cutting tool assembly for artificial joint surgery that guides a cutter of a bone cutting device in a direction perpendicular to a longitudinal direction of the bone so that a cutting section of the bone is perpendicular to the longitudinal direction of the bone.

B. DESCRIPTION OF THE RELATED ART

As human lifespan has greatly increased compared to the past, cartilage constituting each joint that plays an important role in human body movement is completely worn out before the end of human lifespan, and degenerative arthritis occurs frequently, and this causes a significant decrease in quality of life in the process of spending the rest of human life.

Recently, in order to medically solve these problems, artificial joint surgery that replaces the original joint with metal, plastic, or ceramic has been actively performed, and furthermore, research activities on surgical techniques for better surgical results.

In general, artificial joint surgery can be applied to all joints, but most of them are performed on the hip joint and knee joint. In this case, the surface of the bone forming the joint is finely trimmed, thin special metal is covered, and plastic (polyethylene insert) is placed between the femur and tibia. By allowing it to act as a cartilage, it allows the hip and knee joints to move flexibly and normally.

In order to do this, the end of the bone constituting the joint is cut by a predetermined length, and a process of inserting a replacement artificial joint having a shape corresponding to the cut portion is performed.

However, in the past, the process of cutting a bone by a predetermined length often relied on, the operator's eye measurement or his/her experience using surgical instruments, so a situation in which the replacement joint did not fit accurately often occurred, which causes a significant drop in the patient's satisfaction with surgery.

In order to solve this problem, a device for guiding a cutter that directly cuts bone in the process of cutting bone has been devised, but the conventionally developed guide devices mostly set an approximate cutting position through an intramedullary femoral implant device. Because of this, there is a problem that some part of the error occurs. Therefore, a method for solving these problems is required.

SUMMARY OF THE DISCLOSURE

In one aspect of the present disclosure, a bone cutting tool assembly comprises a guide unit including a body having at least one guide slit and an anchor configured to extend from a side of the body, having a plurality of pin insertion holes; and a length measuring unit including a reference module having a slit insertion part inserted into the guide slit and a moving guide part extending in a direction perpendicular to a surface of the slit insertion part, and a position variable module slidingly coupled to the reference module through the moving guide part.

The length measuring unit may be formed in a pair.

The moving guide part may include an indicator for measuring a length on a surface of the moving guide part.

The position variable module may include a linear moving part formed to be movable along the moving guide part and a reference measuring part connected to the linear moving part in parallel to the slit insertion part.

The linear moving part may be coupled to a movement restraining unit to selectively stop a movement of the linear moving part.

The bone cutting tool assembly may further comprise a pair of protection units coupled to both side of the guide unit, respectively, each the protection unit may include an outer extension extending in a longitudinal direction of the guide unit, a bending part extending in a direction perpendicular to the longitudinal direction of the outer extension from a side of the outer extension and a mounting part inserted into a groove formed on a side of the body of the guide unit.

The bone cutting tool assembly may further comprise a positioning unit including a fixing piece inserted into the guide slit of the guide unit and a fixing bar formed in a parallel to the fixing piece and a reference setting unit having a mount hole into which the fixing bar is inserted.

The moving guide part may have a stopper protruding outward from a circumference of the moving guide part at a distal portion of the moving guide part.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF PREFERRED EMBODIMENTS

Figure 1:
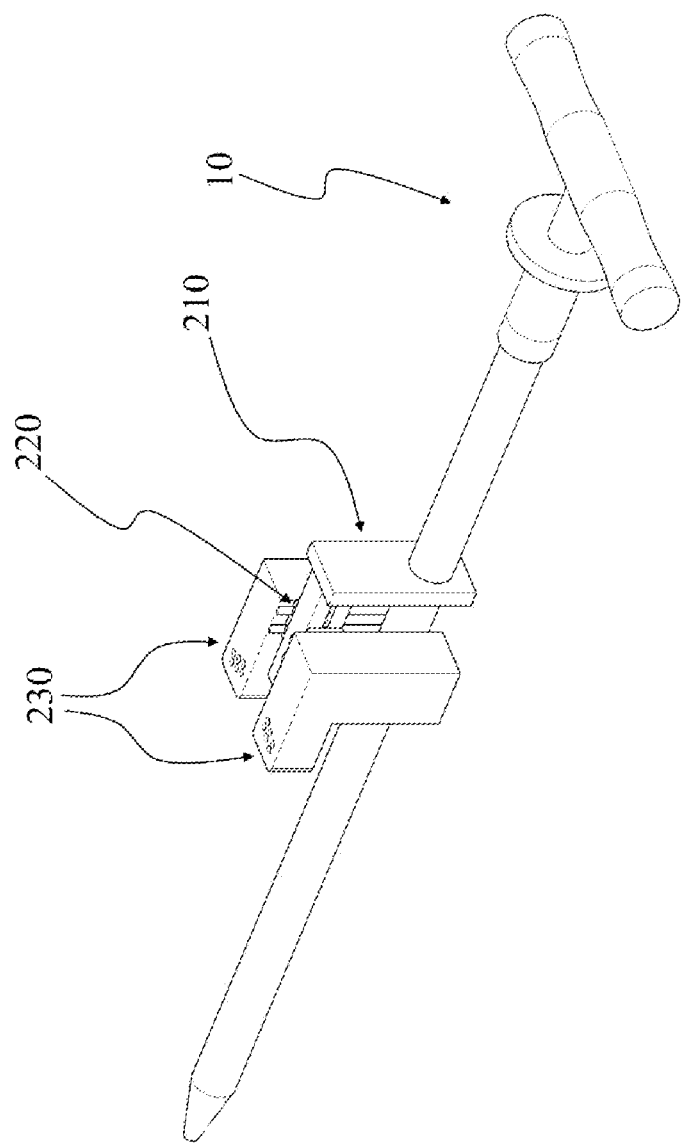
FIG. 1 is a view of an assembly in which a guide rod, a reference setting unit, and a positioning unit that are coupled together in a bone cutting tool assembly for artificial joint surgery according to an embodiment of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, or a device.

Components shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components that may be implemented in software, hardware, or a combination thereof.

It shall also be noted that the terms "coupled," "connected," "linked," or "communicatively coupled" shall be understood to include direct connections, indirect connections through one or more intermediary devices.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments.

The terms "comprise/include" used throughout the description and the claims and modifications thereof are not intended to exclude other technical features, additions, components, or operations.

Unless the context clearly indicates otherwise, the singular forms "a," "an," and "the" are intended to include the plural forms as well. Also, when description related to a known configuration or function is deemed to render the present disclosure ambiguous, the corresponding description is omitted.

FIGS. 1 to 8 are a diagram illustrating a bone cutting guide tool assembly for artificial joint surgery according to embodiments of the present disclosure.

As depicted, the bone cutting tool assembly may include a guide rod 10, a reference setting unit 20, a positioning unit 30, a guide unit 100, a length measuring unit 200, and a protection unit 300. Hereinafter, through FIGS. 1 to 5, the each of the components of the bone cutting tool assembly will be described according to the order used in the artificial joint surgery.

Figure 2:
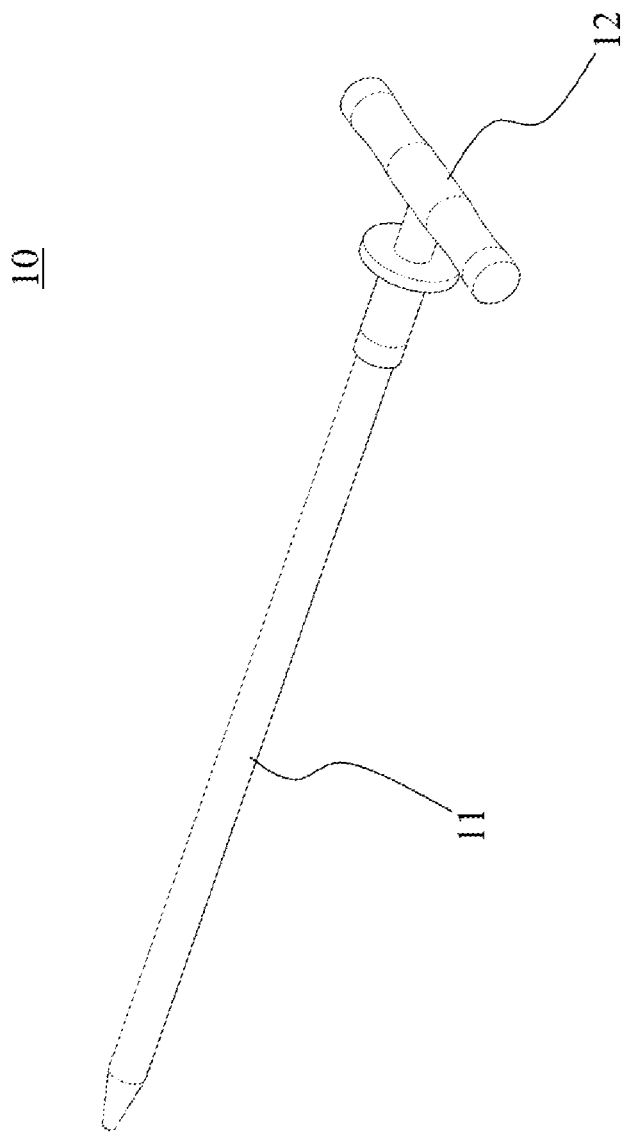
FIG. 2 is a view illustrating a guide rod in a bone cutting tool assembly for artificial joint surgery according to an embodiment of the present disclosure.
Figure 3:
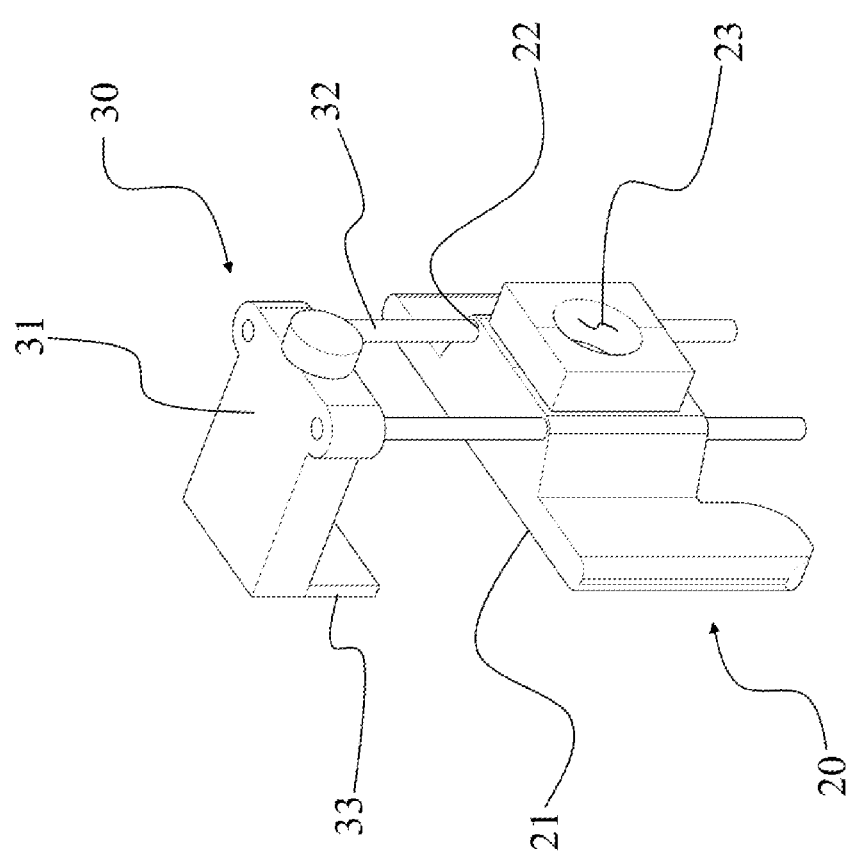
FIG. 3 is a view of an assembly in which a reference setting unit and a positioning unit are engaged with each other in a bone cutting tool assembly for artificial joint surgery according to an embodiment of the present disclosure.

FIG. 1 is a view of an assembly in which a guide rod, the reference setting unit, and the positioning unit that are coupled together in a bone cutting tool assembly for artificial joint surgery according to an embodiment of the present disclosure, FIG. 2 is a view illustrating a guide rod in a bone cutting tool assembly for artificial joint surgery according to an embodiment of the present disclosure, and FIG. 3 is a view of an assembly in which the reference setting unit 20 and the positioning unit 30 are engaged with each other in a bone cutting tool assembly for artificial joint surgery according to an embodiment of the present disclosure.

Each of the components shown in FIGS. 1 to 3 is components that are previously used before using the guide unit 100, the length measuring unit 200 and the protection unit 200 during artificial joint surgery.

In the following description, terms indicating directions are based on the directions indicated in the drawings. However, the term is only set for convenience of explanation and is not intended to limit the rights of the present invention.

As depicted in FIG. 2, the guide rod 10 may be formed by T-shaped structure and be provided to be inserted into a bone through a hole drilled at the end of the bone to be operated. In embodiments, the guide rod 10 may include a rod part 11 which is formed long in the longitudinal direction and a grip part 12 which is provided at the end of the rod part so that the operator can grip the grip part 12. In embodiments, a distal part of the rod part 11 may be introduced into a drilling hole formed in the bone, and the distal part of the rod part 11 may be formed in a shape in which the cross-sectional area is gradually reduced to facilitate insertion into the hole of the bone. In embodiments, the grip part 12 may be provided at a proximal part of the rod part 11 and may be vertically connected to the rod part so that the operator can easily grip it.

As depicted in FIG. 3, the reference setting unit 20 may have a through hole 23 which the rod part 11 of the guide rod 10 passes through, and a reference plane 21 forming an angle perpendicular to the rod part 11 in a state in which the reference plane 21 is partially in contact with the maximum protrusion of the end of the bone. In addition, the reference setting unit 20 may further have a pair of mount holes 22 that are driven therein in a direction perpendicular to the through hole 23 and the pair of mount holes 22 may be spaced apart from each other. The positioning unit 30 may include a base 31, a fixing piece 33 extending from one end of the base 31 in a direction perpendicular to a surface of the base 31, and a pair of fixing bars 32 extending from the other end of the base 31 in a direction perpendicular to the surface of the base 31. In embodiments, the pair of fixing bars 32 may insert into the pair of mount holes 22 so that the positioning unit 30 is tightly engaged with the reference setting unit 20. In embodiments, the fixing piece may be inserted into a guide slit 111 described later in conjunction with FIG. 6. Such the positioning unit 30 may support the guide unit 100, which will be described later, to be seated at a predetermined position on the bone in a state in which the positioning unit 30 is fixed to the reference setting unit 20.

Figure 4:
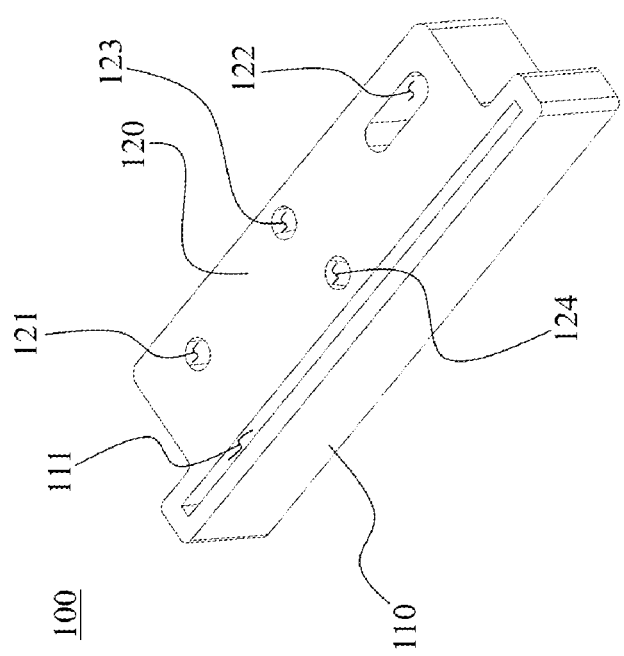
FIG. 4 is a perspective view of an assembly in which a guide unit, a length measuring unit and a protection unit are coupled together in a bone cutting tool assembly for artificial joint surgery according to an embodiment of the present disclosure.
Figure 5:
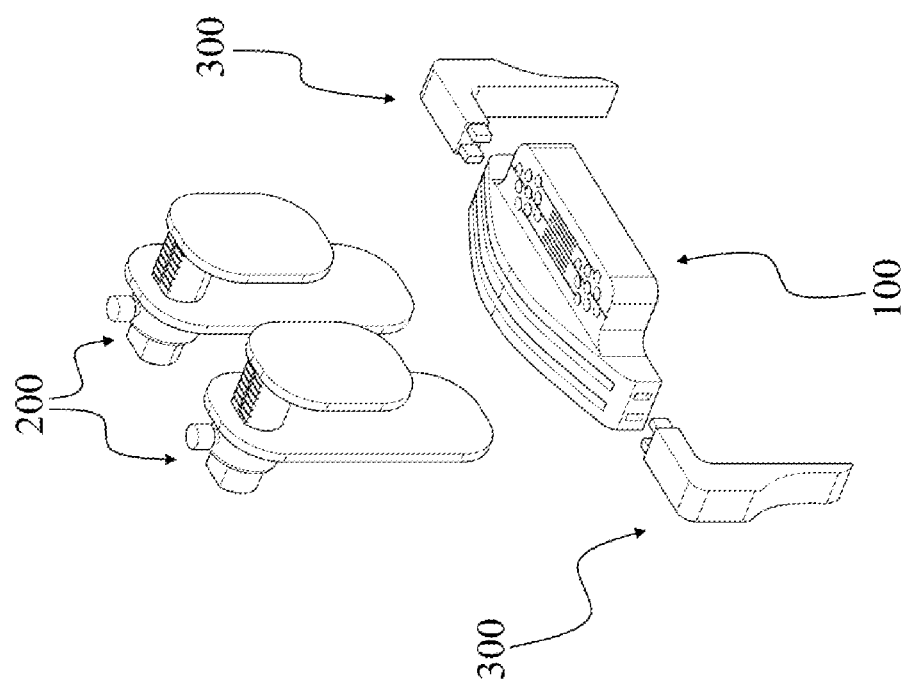
FIG. 5 is an exploded perspective view of the assembly of the FIG. 4 according to an embodiment of the present disclosure.
Figure 6:
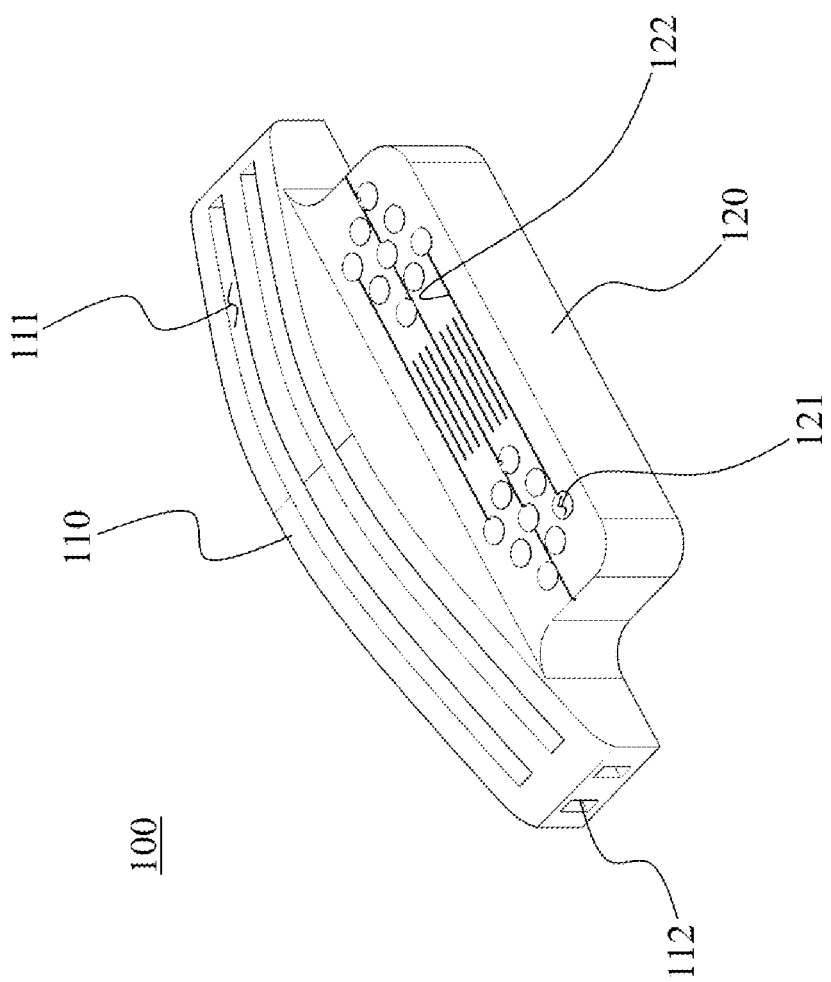
FIG. 6 is a view illustrating a guide unit of a bone cutting tool assembly for artificial joint surgery according to an embodiment of the present disclosure.
Figure 7:
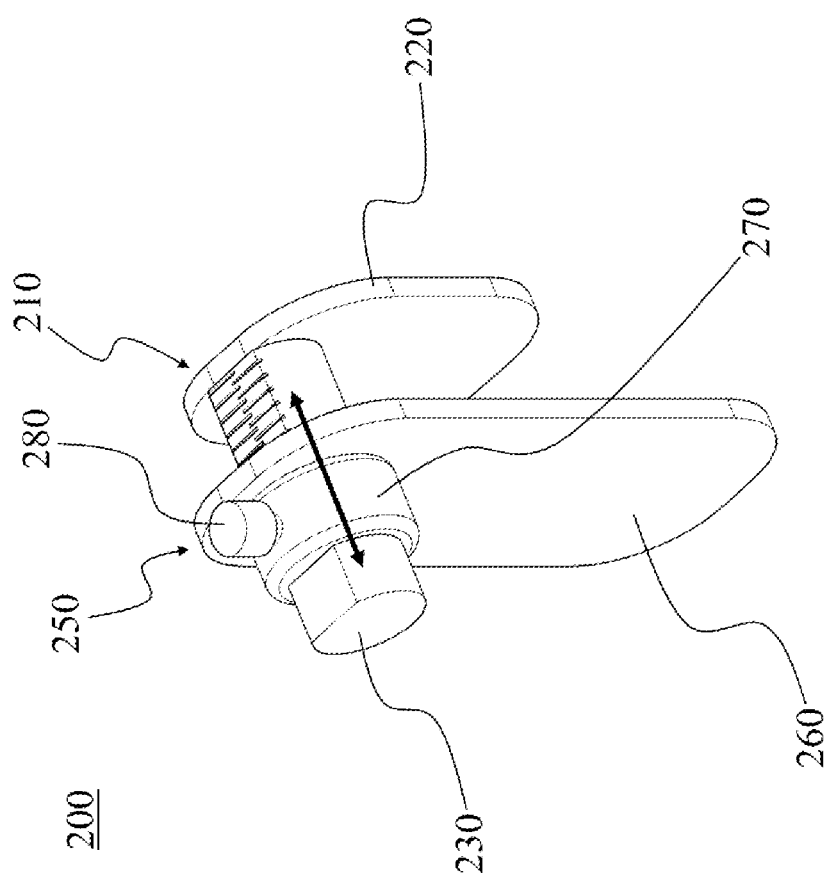
FIG. 7 is a view illustrating a length measuring unit of a bone cutting tool assembly for artificial joint surgery according to an embodiment of the present disclosure.
Figure 8:
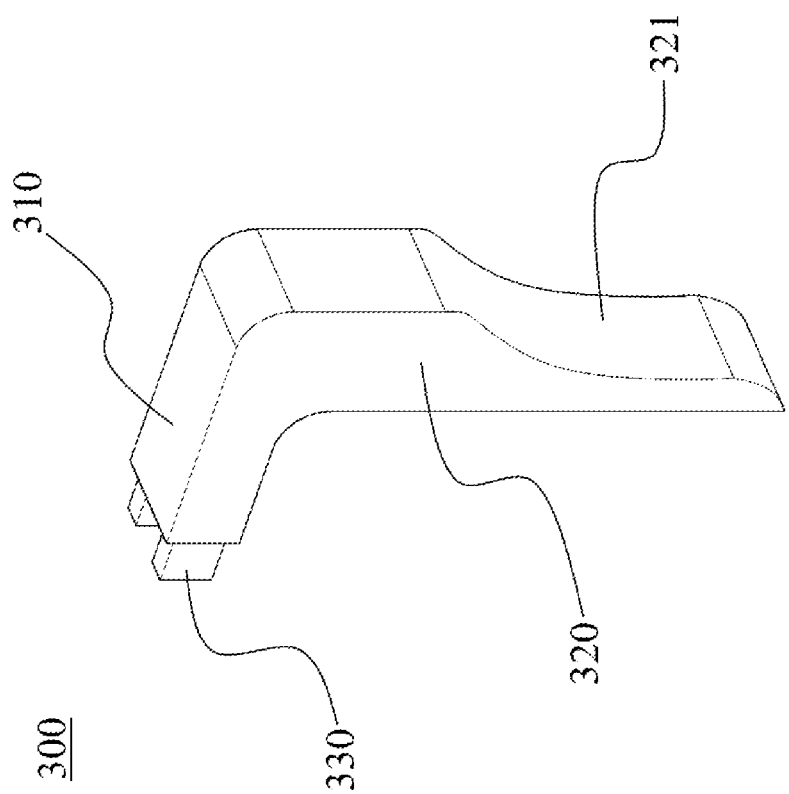
FIG. 8 is a view illustrating a protection unit of a bone cutting tool assembly for artificial joint surgery according to an embodiment of the present disclosure.

FIG. 4 is a perspective view of an assembly in which a guide unit, a length measuring unit and a protection unit are coupled together in a bone cutting guide tool assembly for artificial joint surgery according to an embodiment of the present disclosure, FIG. 5 is an exploded perspective view of the assembly of the FIG. 4, FIG. 6 is a view illustrating a guide unit of a bone cutting guide tool assembly for artificial joint surgery according to an embodiment of the present disclosure, FIG. 7 is a view illustrating a length measuring unit of a bone cutting guide tool assembly for artificial joint surgery according to an embodiment of the present disclosure, FIG. 8 is a view illustrating a protection unit of a bone cutting guide tool assembly for artificial joint surgery according to an embodiment of the present disclosure.

Each of the components shown in FIGS. 4 to 8 are components that are used after performing a function of the guide rod 10, the reference setting unit 20 and the positioning unit 30 during artificial joint surgery.

As depicted in FIG. 6, the guide unit 100 may include a body 110 and an anchor 120 extending from a side of the body 110. In embodiments, the body 110 may have a guide slit 111 that is formed in a longitudinal direction of the body 110. The body 110 may have a plurality of guide slits. In this case, the plurality of the guide slits 111 may be disposed on the body 110 parallel to each other. Such the guide slit 111 is enabled to guide the movement of a cutter which the cutter cuts the end of the bone. In embodiments, the anchor 120 may have a plurality of pin insertion holes 121 therein so that the anchor 120 is fixed to a pin put into a bone. In embodiments, each of the plurality of pin insertion holes 121 may be disposed at a different position of the anchor 120. Such the guide unit 100 may be mechanically coupled with the above-described the guide rod 10, the reference setting unit 20 and the positioning unit 30 so that the guide unit 100 is seated at the end of the bone and fixed in an accurate position of the bone.

As depicted in FIG. 7, the length measuring unit 200 may include a reference module 210 and a position variable module 250, and such two components are mechanically coupled to each other. In embodiments, the length measuring unit 200 may be formed as a pair as shown in FIGS. 4 and 5.

The reference module 210 may include a slit insertion part 220 formed to be inserted into the guide slit 111 of the guide unit 100 and a moving guide part 230 extending in a direction perpendicular to the surface of the slit insertion part 220. In embodiments, the moving guide part 230 may have an indicator for measuring a length marked on an upper surface of the moving guide part 230.

The position variable module 250 may include a linear moving part 270 inserted into the moving guide part 230 of the reference module 210 and formed to be movable along the moving guide part 230, a reference measuring part 260 connected to the linear moving part 270 with a predetermined area to contact the end of the bone, and a movement restraining unit 280 coupled to the linear moving part 270 to selectively stop the movement of the linear moving part 270. In embodiments, the slit insertion part 220 and the reference measuring part 260 may be disposed to have an angle perpendicular to the longitudinal direction of the bone. As the reference measuring part 260 of the position variable module 250 is contact the end of the bone, the operator can measure the length form the guide slit 111 of the guide unit 100 to the end of the bone.

As depicted in FIG. 8, the protection unit 300 may include an outer extension 310 extending in the longitudinal direction of the guide unit 100, a bending part 320 extending in a direction perpendicular to the longitudinal direction of the outer extension 310 from one side of the outer extension 310, and a mounting part 330 for fixing the outer extension 310 to the guide unit 100. In embodiments, the bending part 320 may include an attachment part 321 with a preset curvature so that tissues such as nerves and muscles around the bone can be attached thereon. In embodiments, the mounting part 330 may be formed in a form of a protrusion protruding toward the guide unit 100 and be inserted into a groove 112 formed on the side of the body 110 of the guide unit 100 described in conjunction with the FIG. 6 and coupled thereto. The protection unit 300 may be formed in a pair and selectively mounted on both sides of the guide unit 100, respectively.

Thus, the protection unit 300 mounted on both sides of the guide unit 100 can allow the operator to secure a margin of the surgical area by attaching the tissue around the bone to the protection unit 300 during artificial joint surgery.

Hereinafter, the process of performing artificial joint surgery through each component of the present embodiment will be described.

FIGS. 9 to 20 are diagrams sequentially illustrating artificial joint surgery procedures using the bone cutting guide tool assembly according to embodiments of the present disclosure.

Figure 9:
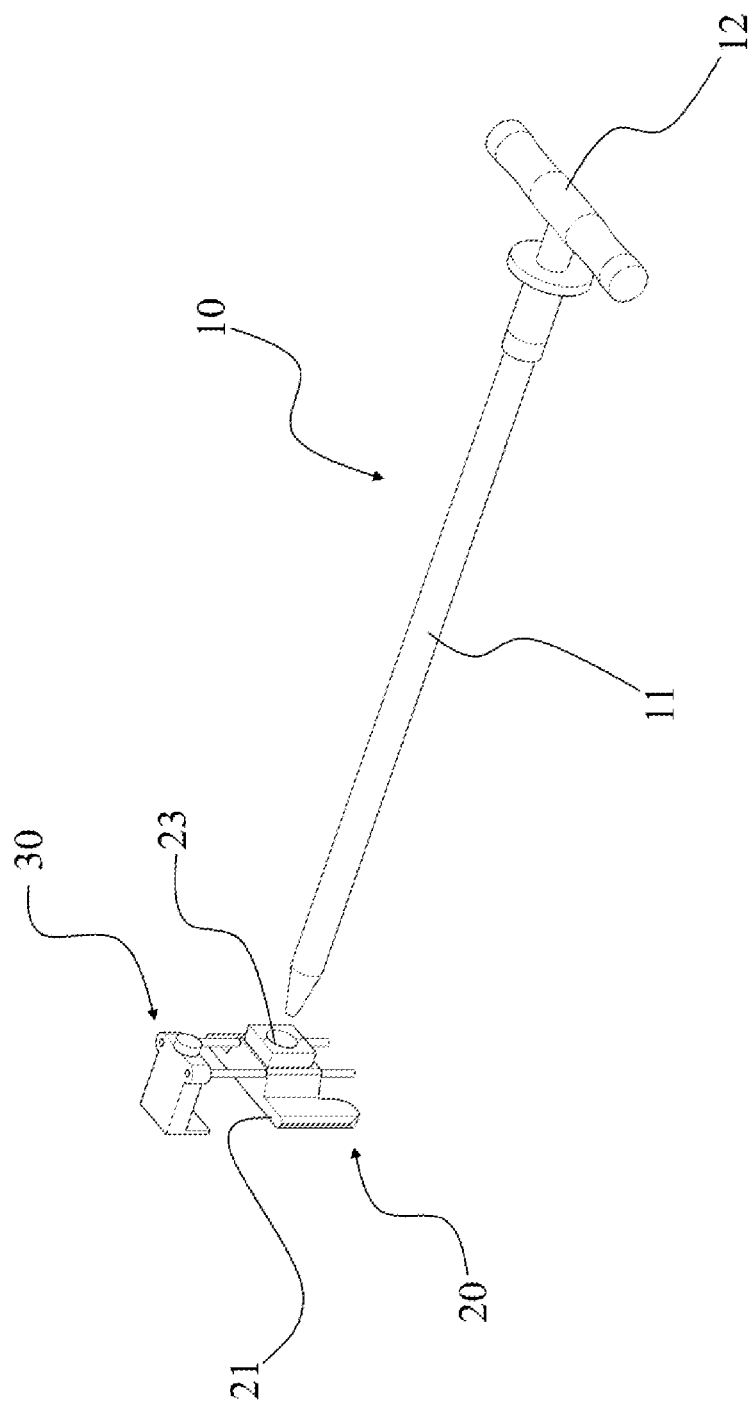
FIGS. 9 to 20 are diagrams sequentially illustrating artificial joint surgery procedures using a bone cutting tool assembly according to embodiments of the present disclosure.

As depicted in FIG. 9, the guide rod 10, the reference setting unit 20 and the positioning unit 30 are prepared. Among this things, the reference setting unit 20 and the positioning unit 30 are previously coupled to each other, and then the guide rod 10 is structurally combined to the reference setting unit 20 by allowing the rod part 11 of the guide rod 10 inserted into the through hole 23 formed in the reference setting unit 20.

Figure 10:
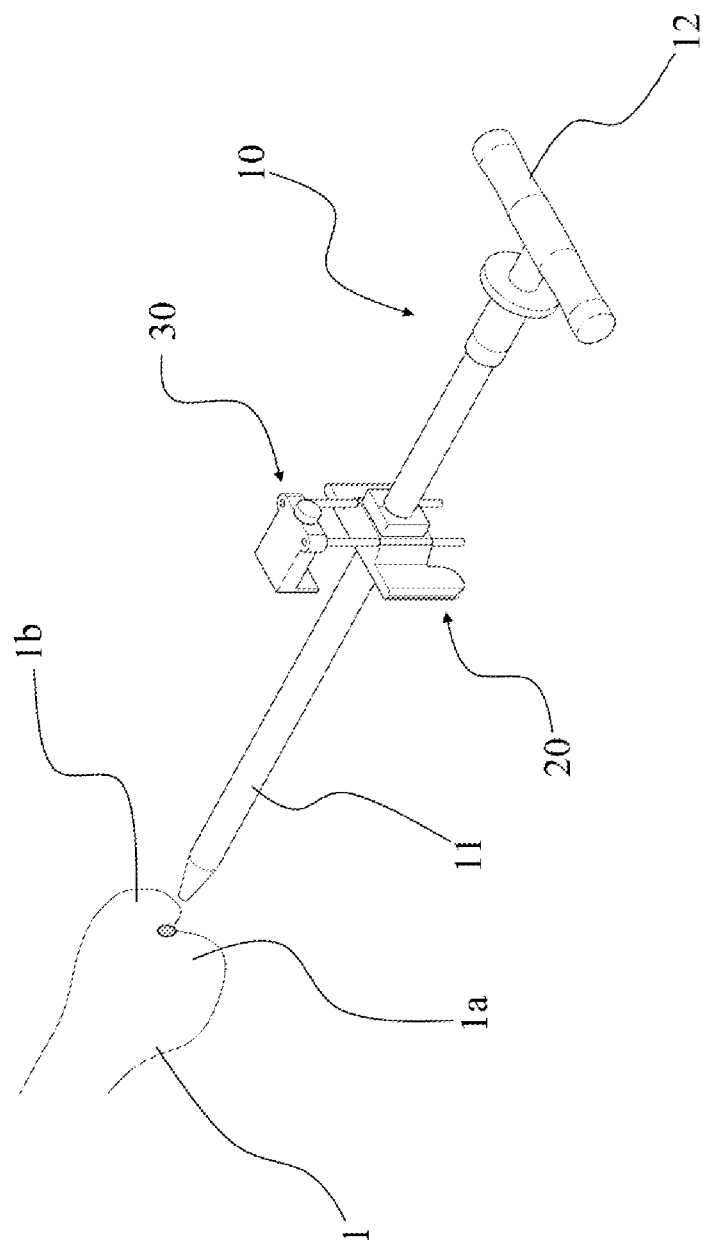

FIG. 10 illustrates a state in which the guide rod, the reference setting unit 20 and the positioning unit 30 are combined to each other. In general, since the end of the bone 1 is formed to be curved, the maximum protruding part may be different depending on patients. The end of the bone 1 of the femoral region shown in the present embodiment forms a curve in which both side parts (1a, 1b) protrude from the center, and among them, the first end 1a was set as having a more protruding state compared to the other second end 1b.

As depicted in FIG. 10, after forming a drilling hole through a tool such as a drill at the end of the bone to be operated on, the rod part 11 of the guide rod 10 into the drilling hole to the bone is inserted and is drawn into the inside of the bone 1. At this time, the rod part 11 may be inserted into the bone 1 by an operator so that a reference plane 21 of the reference setting unit 20 reaches to a protruding part formed at the end of the bone 1.

Figure 11:
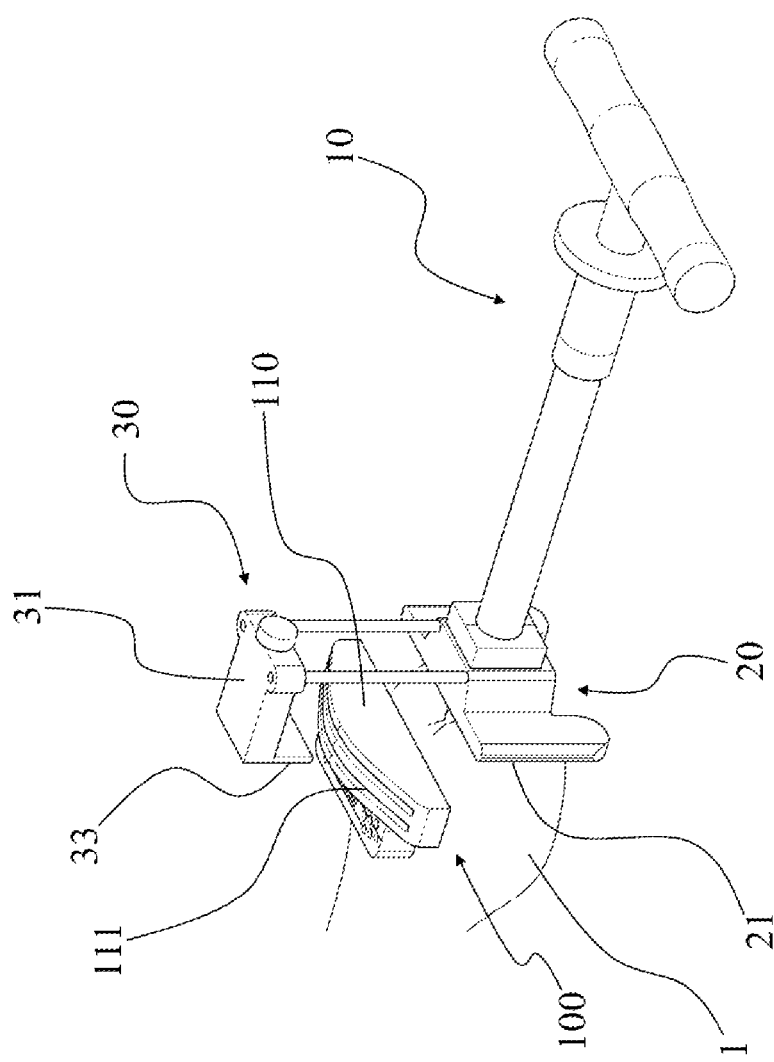

In this state, as depicted in FIG. 11, the operator may pull up the fixing bar 32 of the positioning unit 30 from the reference setting unit 20 so that the reference setting unit 20 and the positioning unit are separated from each other. Thereafter, the guide unit 100 may be positioned on the top of the bone 1, and the fixing piece 33 of the positioning unit 30 may be inserted into the guide slit 111 of the guide unit 100. Since a distance from the reference plane 21 of the reference setting unit 20 to the fixing piece 33 of the positioning unit 30 is constant, the position of the guide unit 100 can be set with respect to the fixing piece 33 of the positioning unit 30 through this process.

Figure 12:
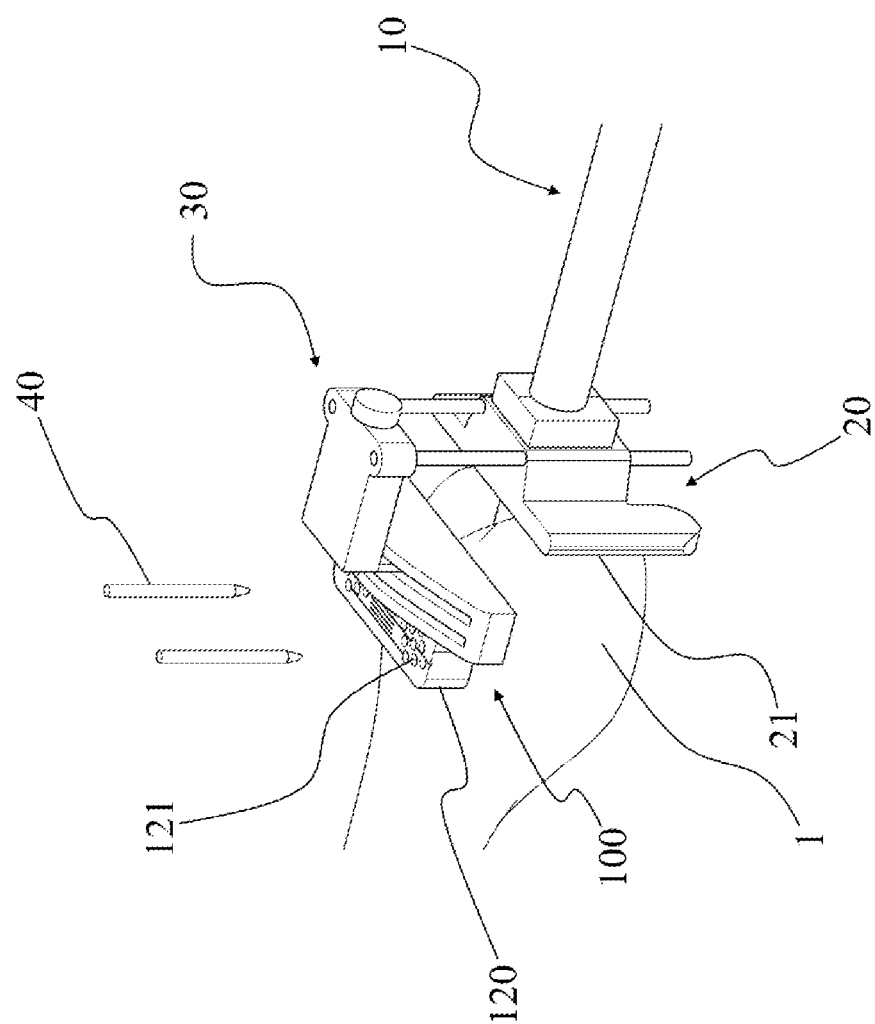

After setting the positions of each the positioning unit 30, as depicted in FIG. 12, a process of inserting a reference pin 40 into an arbitrary pin installation hole among a plurality of pin installation holes 121 formed in the anchor 120 of the guide unit 100 is performed thereby the reference pin 40 is driven into the bone 1. Accordingly, the guide unit 100 can be fixed on the bone 1. In this case, a fixing position of the reference pin 40 may be appropriately selected according to a surgical plan or a shape of the bone 1.

Figure 13:
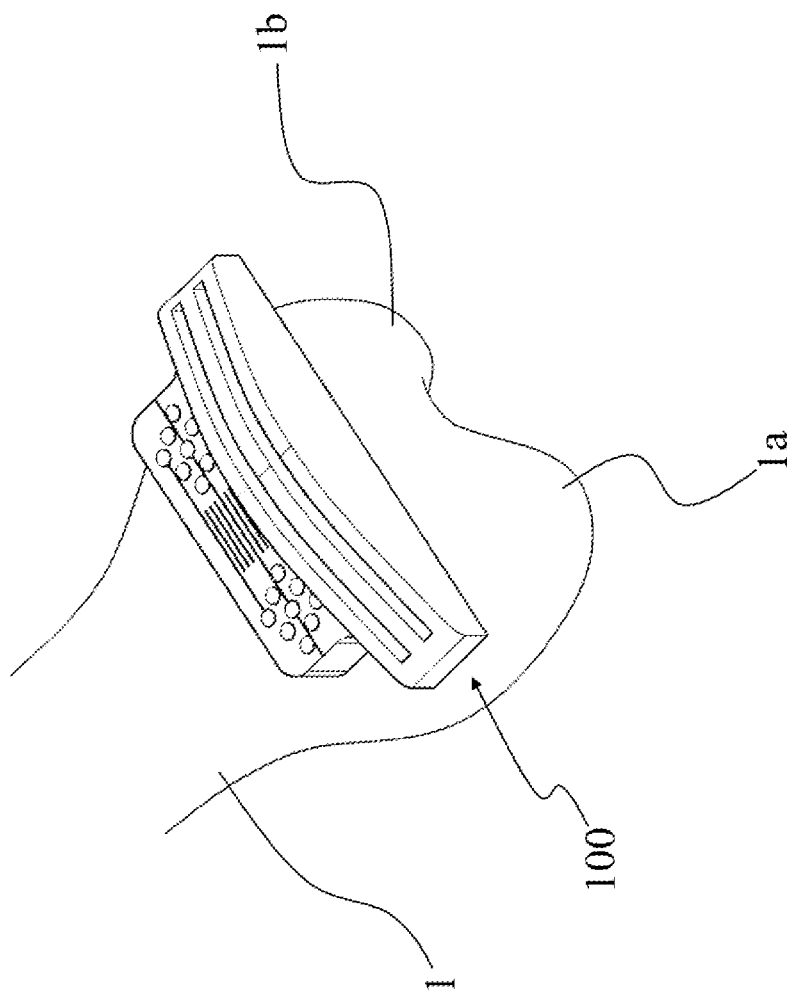

In a state where the guide unit 100 is fixed to the upper part of the bone 1, as depicted in FIG. 13, the guide rod 10, the reference setting unit 20 and the positioning unit 30 are removed, only the guide unit 100 remains on the bone 1.

Figure 14:
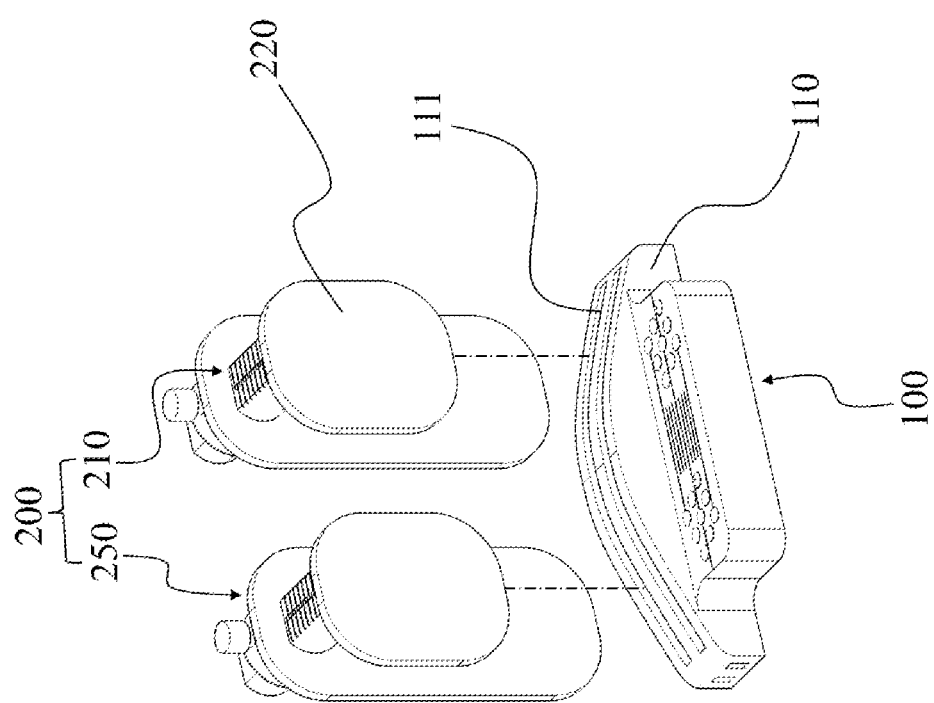

After that, as depicted in FIG. 14, the pair of length measuring units 200 may be prepared, and the slit insertion part 220 provided in the reference module 210 of the length measuring unit 200 may be inserted into any guide slit 111 of the guide unit 100.

Figure 15:
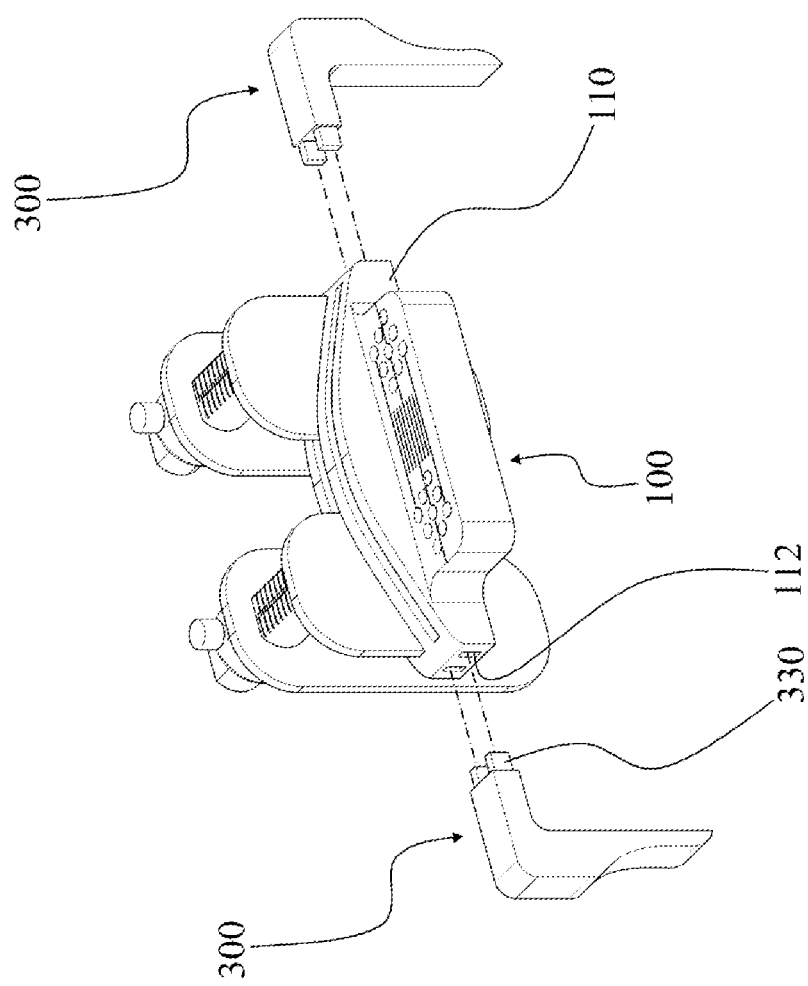

In addition, as depicted in FIG. 15, the pair of protection units 300 may be coupled to the side of the guide unit 100. In embodiments, each of the protection units 300 may have at least mounting part 330 and the guide unit 100 may have the groove 112 corresponding to the mounting part 330. Since the mounting part 330 of the protection unit 300 is formed in a protruding shape, the mounting part 330 can be coupled to the guide unit 100 by fitting into the groove of the body 110 of the guide unit 100.

Figure 16:
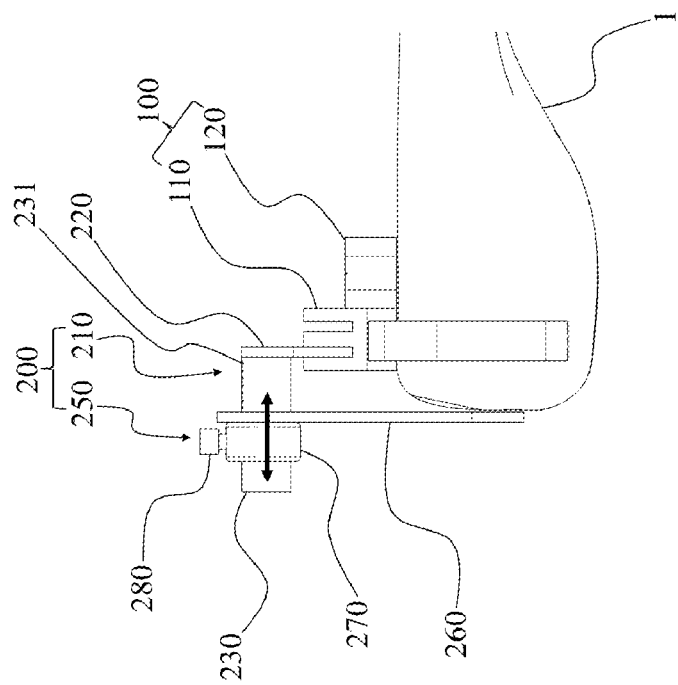

Next, as depicted in FIG. 16, the position variable module 250 of the length measuring unit 200 can be linearly moved along the moving guide part 230 in the longitudinal direction of the moving guide part 230 so that the reference measuring part 260 comes into contact with the end of the bone 1. For patients who need artificial joint surgery, the end of the bone 1 generally has a curve shape in which both sides 1a, 1b of the bone has a form protruding from the center of the end of the bone 1 and any one of the first end 1a and the second end 1b of the bone 1 has a more protruding form that the other end. In embodiments, in a state which one of the pair of the length measuring units 200 spaced apart from each other, one of the reference measuring parts 260 may be in contact with the first end 1a of the bone 1 and another one of the reference measuring parts 260 may be in contact with the second end 1b of the bone 1.

Figure 17:
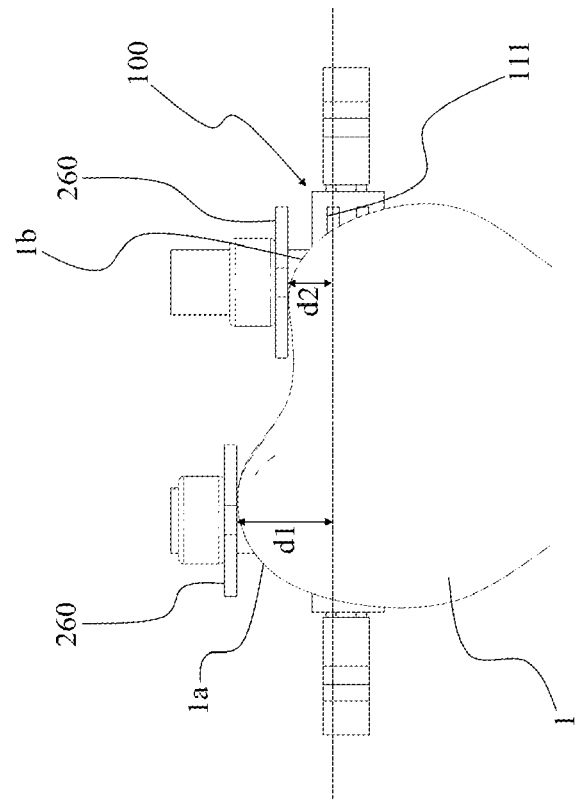

FIG. 17 illustrates a view from the bottom of a bone in a state which a measuring parts is contact with an end of the bone.

As depicted in FIG. 10, each of the reference measuring parts 260 is contact with the first end 1a and second end 1b of the bone 1, respectively. At this time, the operator may measure a distance d1 between the first reference measuring part 260 of the length measuring unit 200 and the guide slit 111 of the guide unit 100, and a distance d2 between the second reference measuring part 260 of the length measuring unit 200 and the guide slit 111 of the guide unit 100 through a scale marked on the moving guide part 230, thereby determining whether the measured distance is appropriate for the surgical design.

Figure 18:
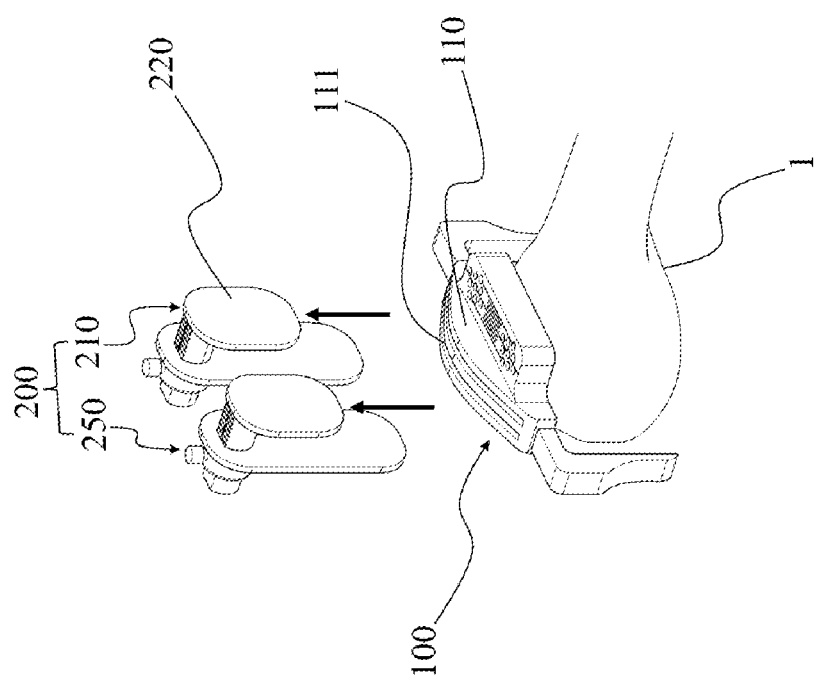

Next, if the measured distance is appropriate the length measuring unit 200 may be removed from the guide unit 100 as depicted in FIG. 18.

Figure 19:
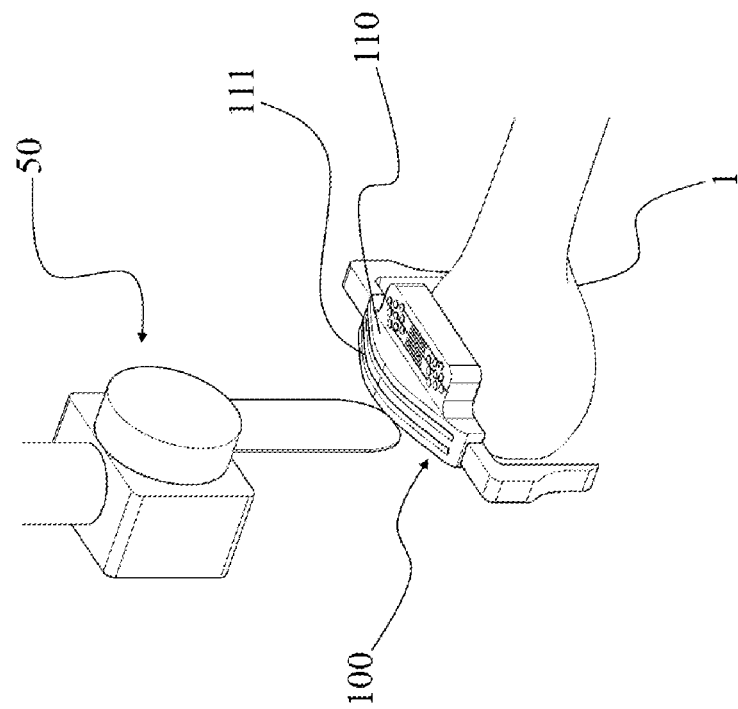
Figure 20:
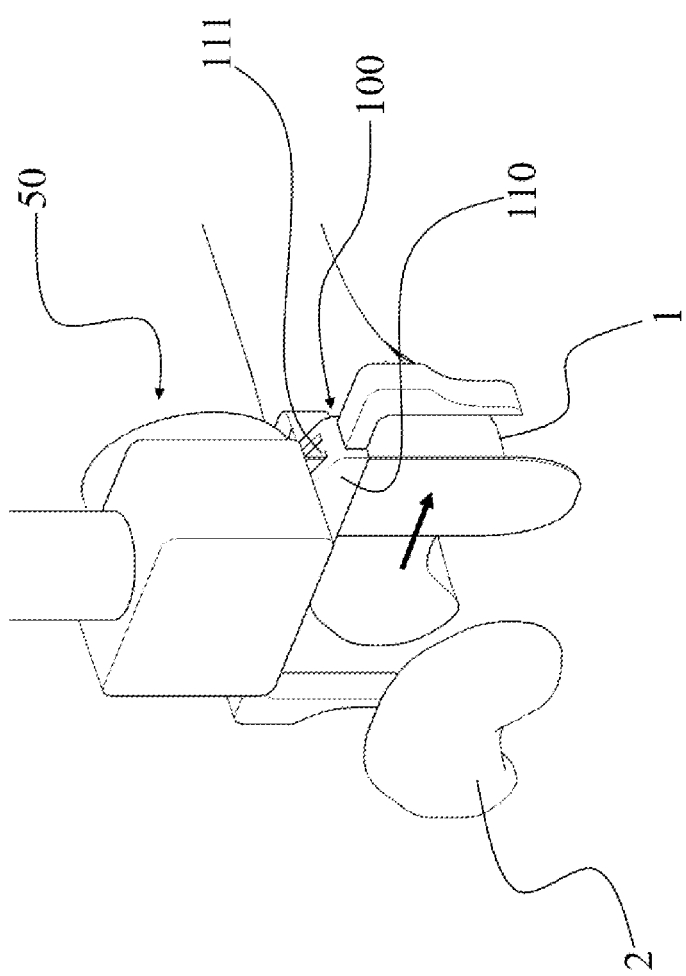

And then, as depicted in FIGS. 19 and 20, a bone cutting device 50 including a cutter is prepared, the cutter of the bone cutting device 40 is inserted into the guide slit 111 of the guide unit 100, and then the bone 1 is cut along the guide slit 111 by the cutter. Accordingly, the piece of cut bone is removed from the bone 1, and then a process of mounting an alternative joint mechanism for an artificial joint to the cutting position of the bone 1 body may be performed.

Figure 22:
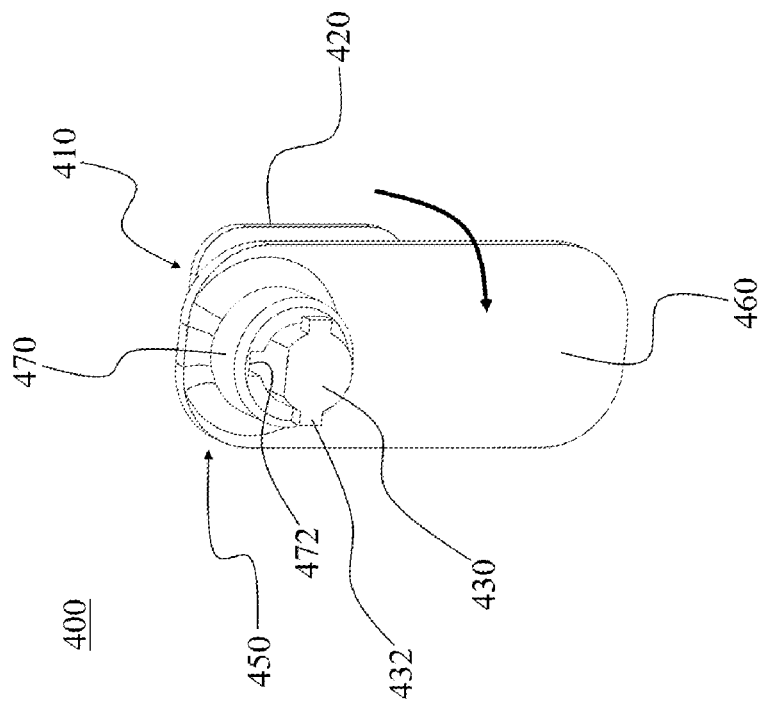
FIG. 22 is a view illustrating an operation of another length measuring unit in a bone cutting tool assembly for artificial joint surgery according to an embodiment of the present disclosure.
Figure 21:
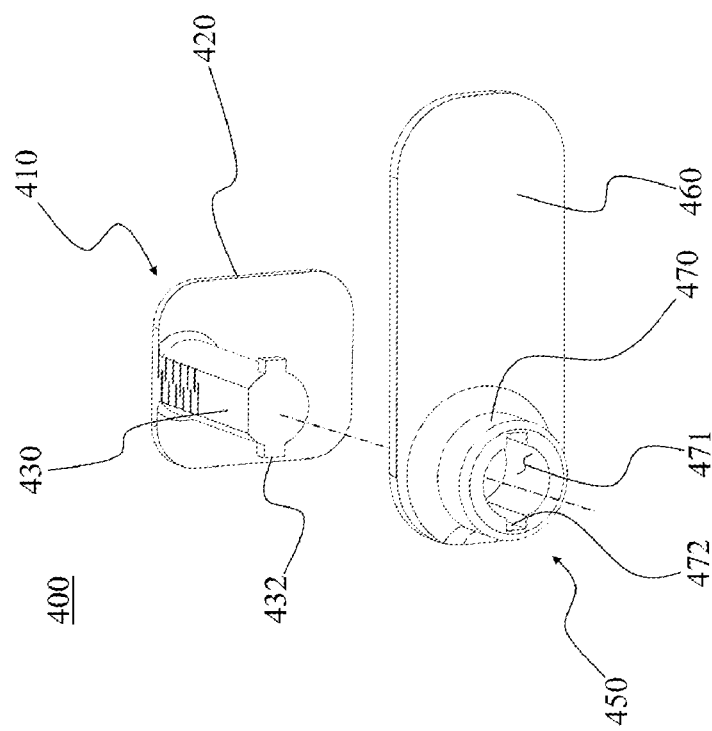
FIG. 21 is an explored view illustrating another length measuring unit in a bone cutting tool assembly for artificial joint surgery according to an embodiment of the present disclosure.

FIG. 21 is an explored view illustrating another length measuring unit in a bone cutting tool assembly for artificial joint surgery according to an embodiment of the present disclosure and FIG. 22 is a view illustrating an operation of another length measuring unit in a bone cutting tool assembly for artificial joint surgery according to an embodiment of the present disclosure, As depicted in FIGS. 21 and 22, each component of the length measuring unit 400 may be similar to counterparts of the length measuring unit 200 in FIG. 7. In embodiments, the moving guide part 430 may include a stopper 432 protruding outward from a circumference of the moving guide part 430 at a distal portion of the moving guide part 430. In embodiments, the position variable module 450 may include an insertion hole 471 in which the moving guide part 430 pass through the linear moving part 470 and the reference measuring part 460 and a channel 472 may be formed on a part of an inner circumference of the insertion hole 471 corresponding to the stopper 432. Regarding the combination of the reference module 410 and the position variable module 450, firstly, as shown in FIG. 21, the moving guide part 430 of the position variable module 450 may be inserted into the insertion hole 471 in a state where the position variable module 450 is rotated at a predetermined angle to match the position of the stopper 432 and the channel 472. Secondly, as shown in FIG. 22, after the stopper 432 of the moving guide part 430 is slid into the channel 472, the reference module 410 and the position variable module 450 may be tightly coupled to each other by rotating the moving guide part 430. Accordingly, since the liner moving part 470 is caught by the stopper 432, it is possible to prevent the position variable module 450 from being separated from the reference module 410.

Figure 23:
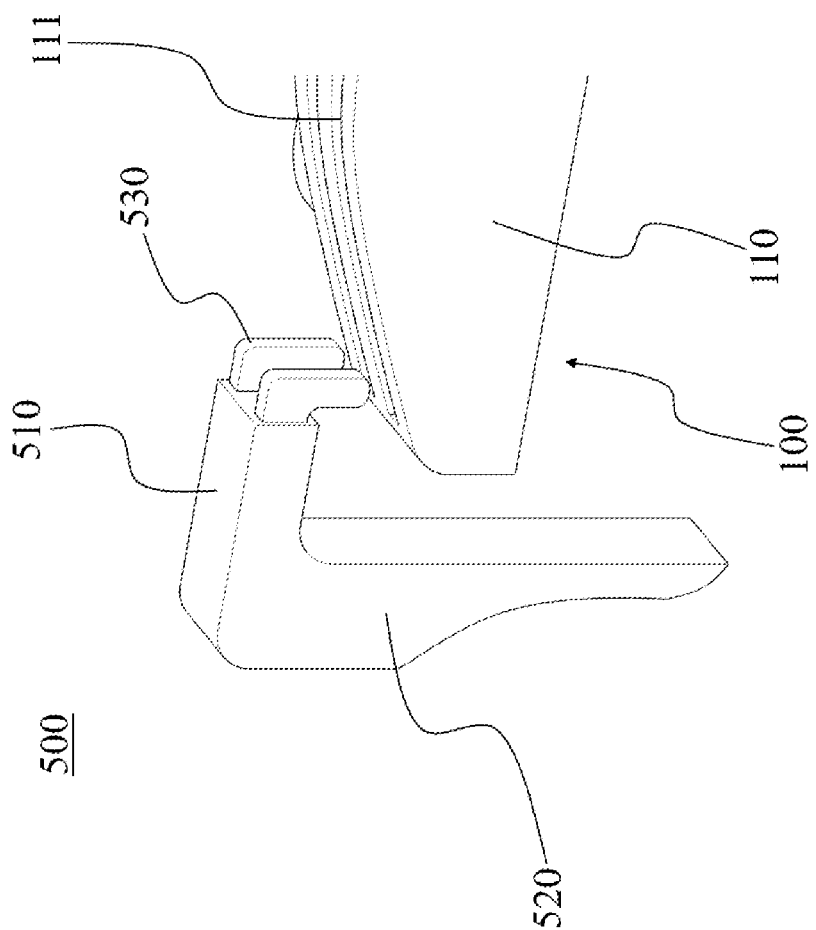
FIG. 23 is a view illustrating a coupling structure of another protection unit and a guide unit in a bone cutting tool assembly for artificial joint surgery according to an embodiment of the present disclosure.

FIG. 23 is a view illustrating a coupling structure of another protection unit and a guide unit in a bone cutting tool assembly for artificial joint surgery according to an embodiment of the present disclosure.

As depicted in FIG. 23, each component 510, 520, 530 of the protection unit 500 may be similar to counterparts 310, 320, 330 of the protection unit 300 in FIG. 8.

In embodiments, the mounting part 530 may be formed in a form of a hook bent parallel to the bending part 520 at a predetermined point thereof. The protection unit 500 may be coupled to the guide unit 100 in such a way that the mounting part 530 is inserted into the outer side of the guide slit 111 formed in the guide unit 100.

In the description, numerous details are set forth for purposes of explanation in order to provide a thorough understanding of the present invention. However, it will be apparent to one skilled in the art that not all of these specific details are required in order to practice the present invention.

Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A bone cutting tool assembly for artificial joint surgery, comprising:
   a guide unit including a body having at least one guide slit and an anchor configured to extend from a side of the body, the anchor having a plurality of pin insertion holes; and
   a length measuring unit including a reference module having a slit insertion part formed to be inserted into the guide slit and a moving guide part extending in a direction perpendicular to a surface of the slit insertion part, and a position variable module slidingly coupled to the reference module through the moving guide part.

2. The bone cutting tool assembly of claim 1, wherein the length measuring unit is formed in a pair.

3. The bone cutting tool assembly of claim 1, wherein the moving guide part includes an indicator for measuring a length on a surface of the moving guide part.

4. The bone cutting tool assembly of claim 1, wherein the position variable module includes a linear moving part formed to be movable along the moving guide part and a reference measuring part connected to the linear moving part and configured to be in parallel to the slit insertion part when the linear moving part and the moving guide part are coupled.

5. The bone cutting tool assembly of claim 4, wherein the linear moving part is coupled to a movement restraining unit to selectively stop a movement of the linear moving part.

6. The bone cutting tool assembly of claim 1, further comprising:
   a pair of protection units coupled to both sides of the guide unit, respectively,
   wherein each of the protection units includes an outer extension extending in a longitudinal direction, a bending part extending in a direction perpendicular to the longitudinal direction from a side of the outer extension, and a mounting part configured to be inserted into a groove formed on a side of the body of the guide unit.

7. The bone cutting tool assembly of claim 1, further comprising:
   a positioning unit including a fixing piece configured to be inserted into the guide slit of the guide unit and a fixing bar formed in a parallel to the fixing piece; and
   a reference setting unit having a mount hole into which the fixing bar can be inserted.

8. The bone cutting tool assembly of claim 1, wherein the moving guide part has a stopper protruding outward from a circumference of the moving guide part at a distal portion of the moving guide part.

* * * * *